US012292673B2

(12) United States Patent
Mitchell et al.

(10) Patent No.: US 12,292,673 B2
(45) Date of Patent: May 6, 2025

(54) HELMET CARRYING A CAMERA

(71) Applicant: DIMENSIONAL IMAGING LTD, Glasgow (GB)

(72) Inventors: Alex Mitchell, Glasgow (GB); Tom Blakeman, Glasgow (GB); Douglas Green, Glasgow (GB); Ewan Borland, Glasgow (GB)

(73) Assignee: DIMENSIONAL IMAGING LTD, Glasgow (GB)

( * ) Notice: Subject to any disclaimer, the term of this patent is extended or adjusted under 35 U.S.C. 154(b) by 649 days.

(21) Appl. No.: 17/436,859

(22) PCT Filed: Mar. 6, 2020

(86) PCT No.: PCT/GB2020/050536
§ 371 (c)(1),
(2) Date: Sep. 7, 2021

(87) PCT Pub. No.: WO2020/183132
PCT Pub. Date: Sep. 17, 2020

(65) Prior Publication Data
US 2022/0163872 A1    May 26, 2022

(30) Foreign Application Priority Data

Mar. 8, 2019  (GB) ...................... 1903152

(51) Int. Cl.
*G03B 17/56*   (2021.01)
*A42B 3/04*    (2006.01)
(Continued)

(52) U.S. Cl.
CPC ............ *G03B 17/561* (2013.01); *A42B 3/042* (2013.01); *A42B 3/30* (2013.01); *G03B 17/566* (2013.01); *H04N 23/56* (2023.01); *F16M 13/04* (2013.01)

(58) Field of Classification Search
None
See application file for complete search history.

(56) References Cited

U.S. PATENT DOCUMENTS 6,121,953 A        9/2000  Walker
2007/0285559 A1*  12/2007  Perlman .................. H04N 23/74
                                                 348/E5.037
(Continued)

FOREIGN PATENT DOCUMENTS

CN    205831187 U    12/2016
CN    206865590 U     1/2018
GB       2380886 A    4/2003

OTHER PUBLICATIONS

European Patent Office, the International Search Report and the Written Opinion of the International Searching Authority, Sep. 28, 2020, 17 Pages.
(Continued)

*Primary Examiner* — Samira Monshi
(74) *Attorney, Agent, or Firm* — PERKINS IP LAW GROUP LLC; Jefferson Perkins

(57) ABSTRACT

A helmet (1) for carrying audio-visual equipment includes a brace member (18) having first and second ends (20, 22). The brace member passes in a spaced apart relationship from the left side of the head to the right side of the head of a wearer in use, until connecting at each end (20, 22) to a respective left or right side of the helmet (1). A boom (24) has a first boom end and a second boom end, the boom connecting at the first boom end to one of the first and second ends (20, 22) of the brace member (18). The boom includes a mounting for carrying at least one camera in a position near the head of a wearer. A method of capturing image data from a face and a power supply system for portable equipment are disclosed.

17 Claims, 7 Drawing Sheets

(51) Int. Cl.
  *A42B 3/30* (2006.01)
  *H04N 23/56* (2023.01)
  *F16M 13/04* (2006.01)

(56) References Cited

U.S. PATENT DOCUMENTS

| | | |
|---|---|---|
| 2010/0079583 A1 | 4/2010 | Griffin |
| 2016/0171864 A1* | 6/2016 | Ciaramelletti ......... A42B 3/046 340/539.11 |
| 2018/0049505 A1* | 2/2018 | Hovan ................... A42B 3/105 |
| 2018/0263523 A1* | 9/2018 | Puttilli ................. A61B 5/6835 |
| 2020/0018975 A1 | 1/2020 | Pombo et al. |

OTHER PUBLICATIONS

United Kingdom Intellectual Property Office, Search Report, Aug. 23, 2019, 5 Pages.
Mimic Productions, web site, https://www.mimicproductions.com/body-and-facial-motion-capture, downloaded Sep. 7, 2021.
Mimic Productions, video, Mimic Showreel | Body and Facial Motion Capture, https://www.youtube.com/watch?v=TweJ34n19TU, downloaded Sep. 7, 2021.

* cited by examiner

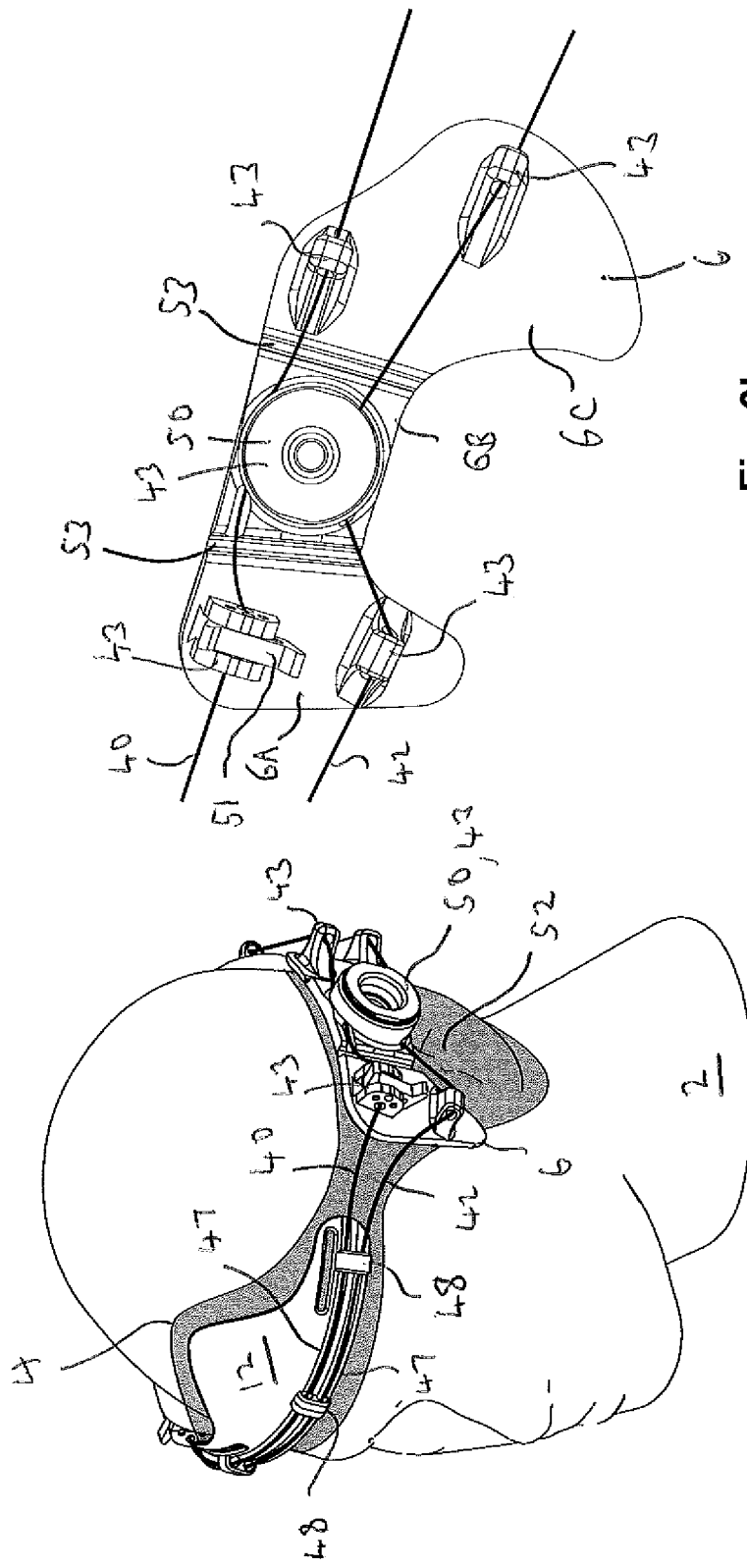

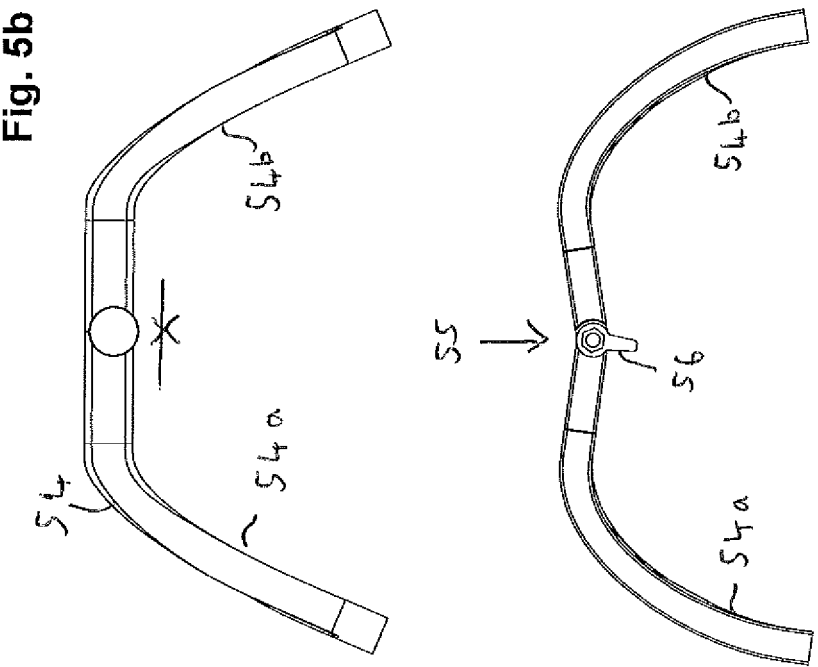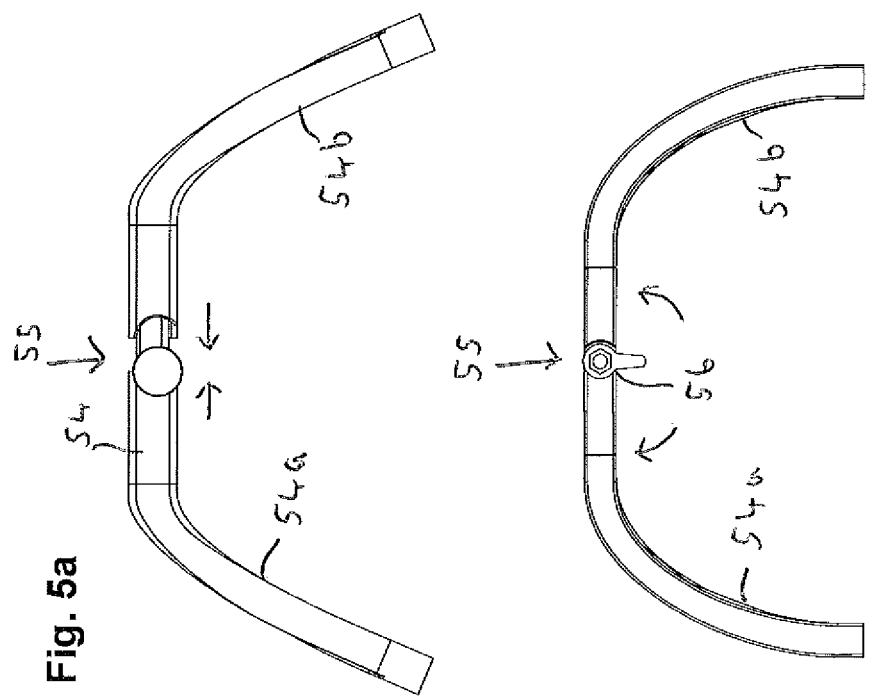

HELMET CARRYING A CAMERA

FIELD

The present invention relates to a helmet that carries camera equipment close to the head. The helmet can find use in the production of animated images derived from a wearer's real facial activity and appearance.

BACKGROUND

Helmets that mount cameras close to a wearer's head are known. A camera or cameras mounted to the helmet on a boom in front of a wearer's face can be used to obtain detailed topographical and motion data from the face, for conversion to animated images for use in video games, animated films and the like. Other uses of such a helmet can be envisaged e.g. to obtain video footage looking away from a wearer, in sports activities such as skiing.

To aid in obtention of high quality data for animation purposes, there should be little relative motion between the camera or cameras employed and the wearer's head. i.e. there should be a generally fixed relationship between the camera(s) and the head of the helmet wearer, in use.

Providing a helmet that can allow a wide range of adjustment in camera positioning, be comfortable to wear for extended periods, and has little relative motion between camera and head of the wearer when in use, presents challenges.

SUMMARY

According to a first aspect of the invention there is provided a helmet for carrying audio-visual equipment, the helmet comprising:
  a) a brace member having first and second ends, the brace member passing in a spaced apart relationship from the left side of the head to the right side of the head of a wearer in use, until connecting at each end to a respective left or right side of the helmet; and
  b) a boom having a first boom end and a second boom end, the boom connecting at the first boom end to one of the first and second ends of the brace member and having a mounting for carrying at least one camera in a position near the head of a wearer.

The brace member connects at its first and second ends to the helmet. The brace member may be of a rigid or a relatively rigid material, such as a metal, a rigid plastic or a carbon fibre composite. Examples of suitable materials may include aluminium or aluminium alloys and plastics such as polyamides. Polyamides or other plastics components such as the brace member may be made by selective laser sintering (SLS) or other 3D manufacturing techniques. The brace member is spaced away from the head except where it connects to the left and right sides of the helmet. This provides support, balance and rigidity to the assembly, without pressing on the head. Typically, the brace member arcs over the top of the head, from one side to the other. Typically, from above one ear to above the other ear. The brace member may arc over the top of the head from one side to the other but be angled from the vertical towards the back of the head. This can provide a counterbalance effect to the weight of the boom which carries at least one camera, typically in front of a wearer's face.

The helmet may comprise one or more support pads. The brace member may connect to at least one support pad. The helmet may also comprise clamping means to adjust the fit of the helmet to a wearers head. For example, to more firmly attach the helmet in place and to allow a helmet with a given size to be used with wearers having different head sizes. Clamping may be achieved by at least one tensioning strap or wire disposed around the helmet.

The brace member may connect to a support pad or pads, which are typically of a relatively stiff material that can nevertheless flex to conform toward the shape of a wearers head. To aid in fitting to a head a support pad may include one or more hinge lines along which one portion of pad material can hinge relative to another portion. For example, a plastics pad material may have one or more grooves reducing its thickness along as line. The groove can act as the hinge An arrangement where the brace member connects to a support pad or support pads can allow a helmet structure that does not include a rigid or relatively rigid shell placed about the head, as in a typical helmet design.

The helmet may include a flexible headband of sheet material for wearing around the head, that mounts the brace member and boom. Where the helmet includes one or more support pads, the support pads are conveniently mounted on or in the flexible headband. This is especially useful where a plurality of support pads are provided, they can be disposed around the flexible headband.

The flexible headband may be of a relatively lightweight material, such as a fabric (as discussed further below) and the support pad or pads employed with the flexible headband can provide sufficient rigidity in desired locations. The clamping means may act on support pads, urging them to a closer fit about the wearers head.

A support pad for connecting to both first and second ends of the brace member may be provided that extends from the left side of the head, around the back to the right side of the head. Alternatively, one support pad can extend from the left side of the head, around the front to the right side of the head.

It is generally preferred that a plurality of support pads are provided, and they are disposed about a flexible headband for clamping to the head of a wearer. Clamping may be achieved by at least one tensioning strap or wire disposed around the headband. This can allow secure and comfortable fitting to the wearer. For example, where a single support pad extends around the back of the head for connection to first and second ends of the brace member, a second support pad may be provided as a forehead support pad.

Alternatively, two of the support pads of the plurality are side support pads, each locating at a respective left or right side of the wearer's head and each connecting to a respective first or second end of the brace member.

The helmet may have four or more support pads, for example the two side support pads, one at the forehead and one at the back of the head. A plurality of support pads may clamp to the head by adjusting the length (tensioning) of one or more straps or wires passing around or through the support pads. The helmet may comprise one or more additional support pads that are not acted upon by the tensioning straps or wires i.e. unclamped support pads.

Conveniently wires or straps may be tensioned (shortened) by means of one or more rotating tensioning knobs, for example located at the back of the head; in a similar manner to those employed in adjusting cycle helmets, ski boots and the like.

To aid in adjustment and to secure the helmet more firmly to the head, a further support pad, a nape support pad, may be located at or near the nape of a wearer's neck and have its own tensioning strap(s) or wire(s) that is or are disposed around the headband. Alternatively, a wire or strap may run from a nape support pad to connect to at least one other component of the helmet for clamping purposes. For example, a wire from the nape support pad is connected to each of the two side support pads by tensioning wires or straps that end at those pads, rather than continuing around the helmet as a loop.

A second control knob at the nape may be used for adjustment of tensioning wires or straps.

Conveniently the function of a nape support pad may be provided as an extension of a back of the head support pad (or a pad that extends from the left side of the head, around the back to the right side of the head). Thus, a back of the head support pad may extend downwards to or near the nape of a wearer's head, in use. In such a support pad one or more tensioning wires or straps may be provided that act around the head and one or more may act down to, or towards, the nape of the neck. The back of the head support pad can mount control knobs or other tensioning devices for both sets of wires or straps.

The support pads (side, and/or others such as forehead, back of the head and untensioned support pads) may be contained in a fabric covering. Where a flexible headband is employed it may comprise the fabric covering for the support pads. Conveniently the support pads are mounted on the outwards facing, in use, surface of the flexible headband.

The brace member is conveniently adjustable in spacing between ends to accommodate different head sizes, and for comfort. Conveniently this is achieved by having a hinge connection in the band, transverse to the length of the brace member, typically at about the mid-point between the ends. The hinge position may be lockable, i.e. securable in a selected fixed position when the helmet is adjusted to suit a particular wearer. Alternatively, the brace member may have two pieces in a sliding relationship, for example a telescopic relationship, that may be lockable. As a yet further alternative the brace member may flex, by having a flexible portion at e.g. the midpoint between ends. An adjustable brace member can provide a degree of clamping of the helmet to a wearer's head.

The brace member can provide a convenient route for attaching cabling associated with the camera(s); and/or for any lighting provided on the helmet. The brace member may also be used to carry equipment. The brace member may comprise connections for cabling, such as connection to helmet mounted cameras and lights for power and video signals. The brace member may comprise a wireless transmitter, receiver or both e.g. a transceiver.

More generally, wireless operation is desirable when using a helmet of the invention as it allows more freedom of movement to a wearer. A connection box may be mounted on the brace member to provide one or more of such connection and communication functions.

When employed, the flexible headband may be of any suitable material for contacting a wearers head, for example a fabric material can be comfortable. A fabric or other sheet material with some elasticity is convenient to accommodate different head sizes and adjustments made to the fitting of the helmet. The flexible headband sheet material may extend over the top of the head of a wearer e.g. in the manner of a cap. However, a band leaving the top of the head open may be more comfortable, for example reducing wrinkling and perspiration.

Where the flexible headband is open, passing around the head but not covering the top, then one or more flexible straps may be provided, each extending across the top of a wearers head in use. For example, connecting to the headband and/or support pads of the helmet. A convenient arrangement is a flexible strap, that may be adjustable and/or have elasticity, passing from front to back of the head. For example, a generally Y shaped strap; with two arms of the Y attaching to or towards either side of the centre of the front of the flexible headband and the third attaching to or towards the centre of the back of the flexible headband.

Where a Y shaped flexible strap is employed and the helmet includes a forehead support pad, then two arms of the Y may attach at left and right portions of the forehead support pad and the third at a support pad, such as a back of the head support pad, that is present at the back of the wearers head.

The boom may connect to the first or second end of the brace member via a support pad that mounts an end of the brace member, i.e. the boom may be mounted, in use, to a support pad, for example a respective left or right side support pad.

The boom may connect directly to the first or second end of the brace member. For example, the boom may connect by having a first boom end comprising a shaft portion that fits into a corresponding slot or groove at an end of the brace member. Conveniently the boom may be connectable to either of the first and second ends of the brace member, to allow fitting of the boom to the left or right side of a wearer. As an alternative the boom may connect at both first and second boom ends to a respective first and second end of the brace member.

Where the boom only connects to one end of the brace member, the mounting for carrying at least one camera may be at the second boom end. The second boom end may be generally positioned, in use, in front of a wearer's face. Where the boom connects to both first and second ends of the brace member (forming a loop), the mounting for carrying at least one camera may be at or near the mid-point of the boom.

In a convenient form of the helmet, a flexible headband may mount one or more, typically all of the support pads, (or at least all clamped support pads) on its outwards facing surface i.e. the surface directed away from a wearer. Thus, the flexible headband may be the only part of the helmet in contact with a wearer's head. Clamping of the support pads to the wearer's head is achieved with the sheet material of the flexible headband in between the clamped support pads and the wearer's head, which can aid comfort in use.

Where a nape support pad is employed, the pad or a fabric covering of the pad may contact the nape of a wearer's neck. Alternatively, a portion of a flexible headband may mount the nape support pad or portions of a back of the head support pad that extend to or near the nape of a wearer.

Where the support pads are mounted to the outwards facing surface of a flexible headband this can allow the tensioning straps or wires to pass through or around the support pads without touching the flexible headband, thereby reducing friction and the forces tending to drag or pull the helmet, especially the flexible headband, towards the points where tensioning is being imposed e.g. towards rotating tensioning knobs when they are employed.

In a particularly convenient arrangement, the tensioning straps or wires may be spaced outwardly from one or more, even all at the tensioned support pads by support pad projections that contact a respective tensioning strap or wire. For example, the tensioning strap or wire may sit in a groove or pass through a bore formed in the support pad projection, to carry and direct the strap or wire about the outside of the bulk of the support pad body, without otherwise contacting it. Such arrangements may aid in adjustment of the helmet into clamping engagement with the head of a wearer in a consistent manner. For example, allowing fine adjustment without dragging the helmet unduly towards the tensioning points. At least the side support pads may have two support pad projections, one towards the front and one towards the back of the support pad, for each tensioning strap or wire acting on it. Thus, where two tensioning straps or wires are employed, one towards the top and the other towards the bottom of a side support pad, then four support projections may be employed—two for each strap or wire. Arrangements making use of more support projections on the side support pads or on other tensioned support pads are contemplated.

The relationship between a tensioning strap or wire and a support pad may be fixed, for example once a helmet has been fitted to a wearer. This can be by locking (e.g. by clamping) the wire or strap to the support pad, to prevent further sliding motion between them. This can be useful especially where the frictional contact between tensioning straps and wires and a support pad has been reduced by the use of support pad projections.

Side support pads are at located at either side of a wearer's head. They may locate at each temple, at least above the ear, and can extend round and down behind the ear to give added security of location and support to the brace member and boom. They may also or alternatively extend down around the front of the ear.

In use cameras mounted to the helmet may be employed as part of an integrated system of cameras, for example in a studio set where several actors act out scenes. In such an arrangement it is desirable to synchronize the frame capture timing of the cameras employed (attached to helmets worn by actors and/or conventionally located cameras recoding the scene more generally). Therefore, the helmet will typically receive a control time signal (time code) to synchronize the frame capture timing of cameras mounted to it. An antenna mounted to the brace member is convenient for receiving this signal.

When the camera(s) mounted on the helmet are in use, the video output may be transmitted wirelessly for live viewing and recording. However, it may also be advantageous to record the video images on recording equipment that is connected by wire to the camera(s). Higher quality image data may be obtained in this way. Therefore, the helmet may also include a recorder for video images. Conveniently the recorder may be mounted off the helmet, for example on a waist belt. The connector module for power supply described below, may include recorder equipment.

Power may be supplied to the helmet from one or more batteries worn by the wearer, for example on a waist belt. Cabling from the battery or from a connector module for the battery may run up the wearers back. The cabling may then proceed to a side of the helmet where it can run from a support pad opposite that where the boom is mounted, across the brace member and along the boom to the camera(s). Conveniently a battery or battery pack suitable for powering the equipment carried on the helmet is connectable into a connector module comprising connections for two or more such batteries or battery packs.

Preferably the connector module includes circuitry to allow 'hot exchange' of the batteries. i.e. batteries can be fitted without interrupting power to the camera and/or other equipment fitted to the helmet. For example, as a first, in use, battery becomes depleted a second, fresh, battery may be fitted to the connector module without interruption to, or overloading of, power supply to equipment on the helmet. The depleted battery can then be removed for recharging without power interruption.

Thus, according to a second aspect the present invention provides a power supply system for portable equipment carried or worn by a user, the power supply system including a connector module comprising:
 a power output connection and connections for two or more batteries or battery packs, each battery pack being capable of providing a desired power output from the output connection; and
 circuitry to maintain power output at the desired level when one of the batteries or battery packs is removed for replacement.

The power supply system may be used with the helmets described herein.

The boom connects to at least one end of the brace member. Preferably the boom, brace member and side support pad all connect through a common fixing to give a fixed relationship (when secured) to all three. The fixing is adjustable e.g. a ball and socket type arrangement allowing for fitting to different head sizes and shapes with choice of precise boom positioning. The boom itself can be adjustable in various ways to allow precise positioning of the camera(s). Each mounting for a camera or cameras may be a ball and socket type joint, (or equivalent in freedom of motion allowed). The boom may be extendible (e.g. telescopic) to allow changing the camera to wearer's head distance and/or to allow adjusting camera position left to right and vertically in front of a wearer's face. The boom may have a portion carrying mounting for a camera that is rotatable relative to the rest of the boom.

The boom can mount at least one camera but may also be used to mount other items, such as lights and microphones. Alternatively, lights and/or microphones may be mounted elsewhere on the helmet, for example on a secondary boom. A secondary boom may connect to the brace member for stability and rigidity.

Lights are useful in providing strong, even, illumination of a face. A strobe light may be employed to reduce fatigue to a helmet wearer's eyes. The strobe light can be synchronized with camera frame timing so that the target face is illuminated when a frame is being captured. For example, the lighting may strobe in alignment with a control time signal that controls camera frame timing. To aid in avoiding photosensitive epilepsy of the wearer or other persons in the vicinity, the strobe lighting rate may be at a multiple of the camera frame rate employed. A strobe lighting frequency at greater than 60 Hz is desirable.

Thus, according to a third aspect the present invention provides a method of capturing image data from a face, the method comprising:
 illuminating a face with strobe lighting; and
 capturing images of the face with at least one video camera;
wherein the strobe lighting frequency is synchronized with the frame capture frequency of the video camera.

The strobe lighting frequency may be a whole multiple of the frame capture frequency of the video camera.

When capturing facial motions for animation purposes two cameras may be employed to more easily obtain three dimensional data. The mounting for at least one camera may itself be adjustable, to allow positioning or further positioning of the lens relative to the face of a wearer.

According to a fourth aspect the present invention provides a method of capturing image data from a face, the method comprising the use of at least one camera mounted to a helmet for carrying audio-visual equipment, as described herein, to obtain video image data.

BRIEF DESCRIPTION OF THE DRAWINGS

FIG. 3a shows a schematic perspective view of a helmet and FIG. 3b shows a side support pad for the helmet;

FIGS. 5a and 5b show a brace member;

FIGS. 5c and 5d show a brace member;

DETAILED DESCRIPTION OF THE DRAWINGS

Figure 1:
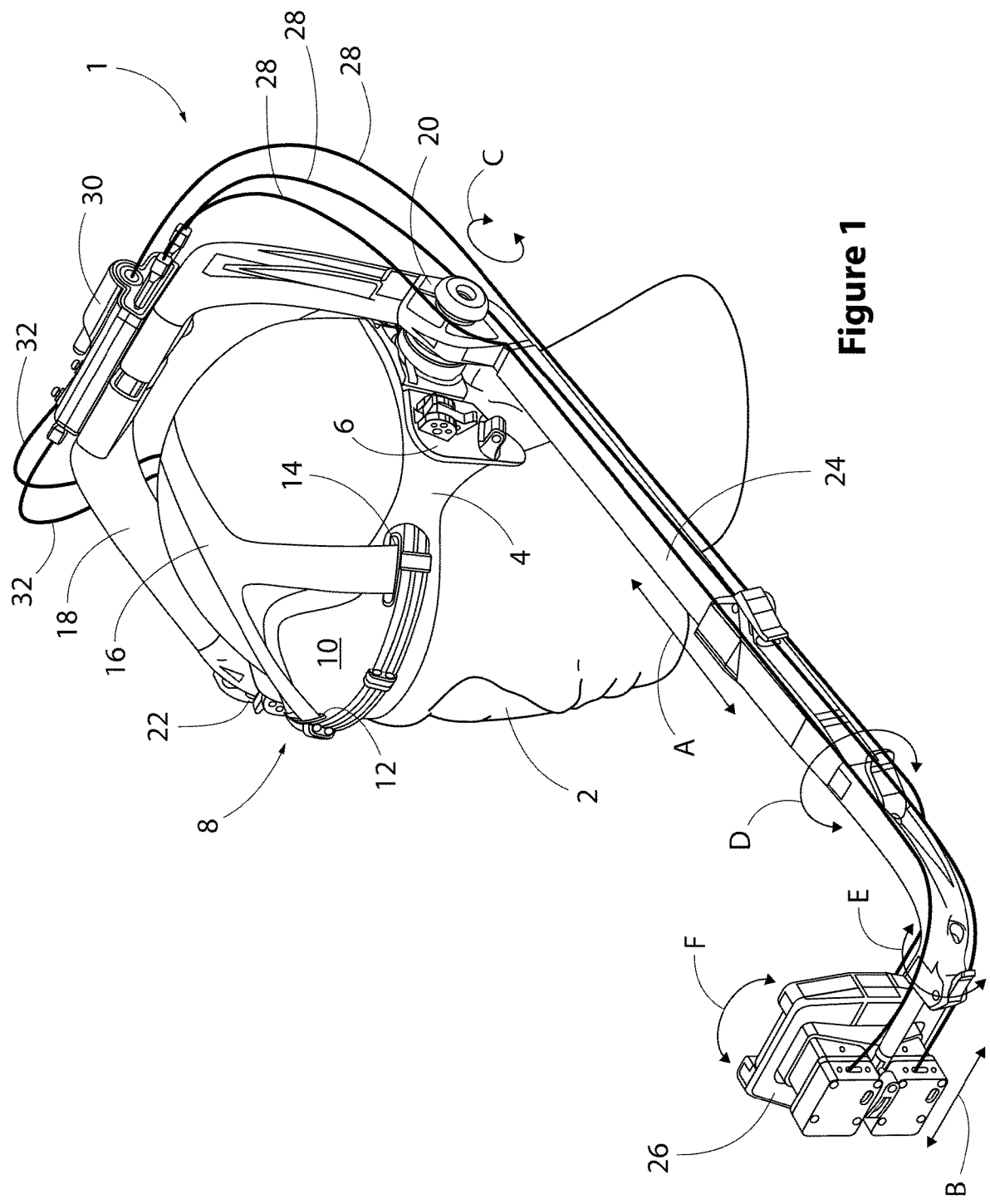
FIG. 1 shows a helmet is schematic perspective view.

FIG. 1 shows in perspective schematic view a helmet 1 fitted to the head 2 of a wearer. The helmet 1 includes a flexible headband 4 of a soft fabric. The headband 4 mounts support pads in various positions, about its outside surface. Visible in this view is a (left) side support pad 6 located above the left ear of the head 2 and extending downwards in front of and behind the ear (see FIG. 2b). A corresponding (right) side support pad 8 (see FIGS. 2a, 2c) is above the right ear of the head 2. A forehead support pad 10 includes slots 12,14 mounting a Y shaped flexible strap 16 that extends across the top of the head from front to back (see FIG. 2c for rear connection).

Connecting to side support pads 6, 8 is a brace member 18, of a generally rigid plastics material, at its first and second ends 20, 22. Brace member 18 is spaced apart from head 2 and the rest of the helmet 1, except at ends 20,22. Brace member 18 mounts a boom 24. Brace member 18 passes over the head 2 from side to side (above one ear to above the other) is angled back towards the rear of head 2. This arrangement spreads the loading provided to the helmet by the boom 24.

Boom 24 mounts at least one, typically a pair of cameras and LED lighting in module 26 at the end distal to the connection to brace member 18. A microphone may also be mounted to module 26. Cables 28, to provide power and signal transmission, runs from connection box 30 mounted at the middle of brace member 18 and out along the boom 24. Power cables 32 feed into the other side of connection box 30 from a battery connector (FIGS. 6 and 7). Connection box 30 also includes a wireless transmitter/receiver for transmitting camera signals and receiving control signals from a base station used to control video capture from the cameras.

Boom 24 is telescopic as indicated by double headed arrows A and B. Further positional adjustment is provided by rotation with respect to side pad 6 at the first end 20 of the brace member 18 as indicated by arrow C. Yet further rotational adjustment is provided as suggested by arrows D, E and F (to provide roll, pitch and yaw adjustment to module 26). A universal joint at the module 26 could be employed, but the arrangement shown allows systematic adjustment in each direction of motion, to achieve the desired camera position.

Not shown in FIG. 1 is the arrangement of tensioning wires used to clamp the helmet 1 to a wearers head. FIG. 2a shows a schematic front view, FIG. 2b a schematic side view and FIG. 2c a schematic rear view of the helmet 1 of FIG. 1, but without the brace member and boom arrangement fitted.

Figure 2C:
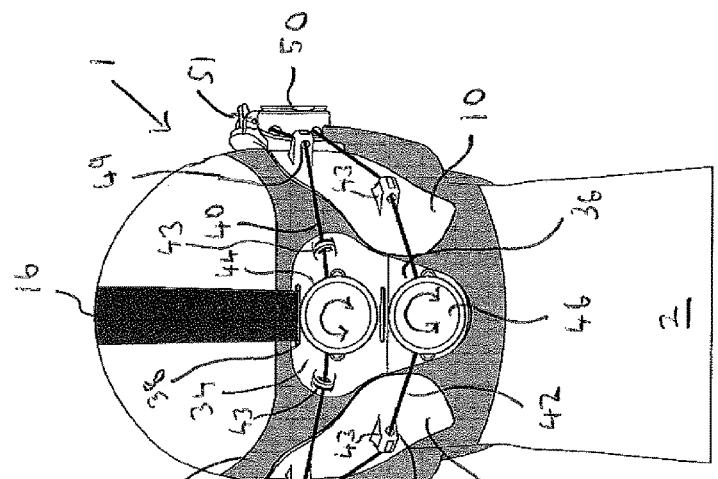
FIGS. 2a, 2b and 2c show respectively front side and rear schematic views of a helmet.
Figure 2B:
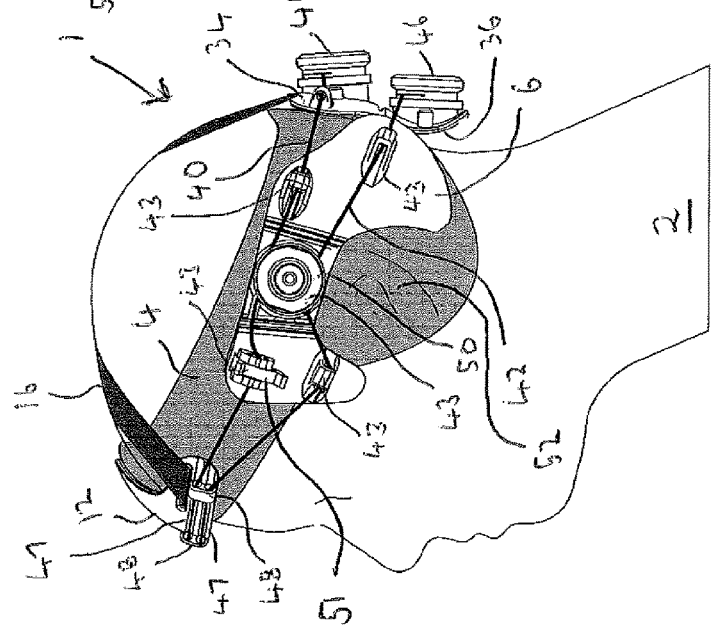
Figure 2A:
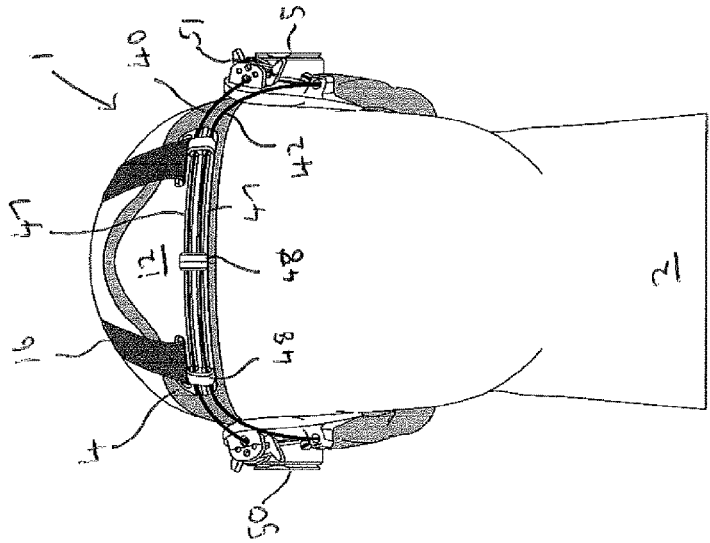

Visible in FIGS. 2b and 2c is a back of the head support pad 34 that includes an extension 36 that sits at the nape of the wearers head. The back of the head support pad includes a slot 38 that receives an end of strap 16.

As can be seen in these views two tensioning wires 40, 42 run around the outside of the helmet 1, passing through support pad projections 43 that generally space the wires away from the support pads and the flexible headband 4, reducing contact. A tension adjusting knob 44 for upper wire 40 is located on the back of the head support pad 34 and a second tension adjusting knob 46, for lower wire 42, is located on the nape extension 36 of the back of the head support pad 34.

In this example instead of support pad projections 43 (as are provided on the side and back of the head support pads), grooves 47 are provided along the forehead support pad 12 that accept wires 40, 42. Guide loops 48 aid in keeping the wires in place.

In use the helmet 1 can be securely clamped to head 2 by adjustment of the length of the tensioning wires 40, 42 by rotating adjusting knobs 44, 46. As the wires 40,42 are generally spaced away from contact with the helmet by the support pad projections 43 using adjusting knobs 44, 46 tends to pull the support pads inwards towards each other, giving an even clamping action towards the head 2, rather than tending to drag the side support pads (and even the flexible headband 4) back toward the rear of the head. The forehead support pad 12, being directly opposite the tensioning knobs 44, 46 is pulled evenly towards the back of the head.

In this example support pad projections 43 include bores through which the wires 40, 42 run. The bores 49 (FIG. 2c) may be lined with a relatively low friction material, to reduce drag further.

Side support pads 8, 10 include bosses 50 for fitting the brace member and boom arrangement. Bosses 50, in this example, also act as a support pad projection 43 for guiding the tensioning wires 40, 42. The paths of tensioning wires around the ear is directed by the positioning of the support pad projections 43.

Also visible in FIG. 2 is a clamp lever 51 provided on a support pad projection 43 of the side support pad 6. A similar arrangement is made on the other side support pad 10. After the helmet is fitted to a user and clamped in place by use of tensioning wires 40,42, clamp levers 51 are operated to clamp cable 40 to the side support pads. This acts to prevent sliding of support pads 6 and 10 from their preferred positions when the helmet is in use.

FIG. 3a shows a perspective view of the arrangements shown in FIG. 2, but without the strap 16 fitted. As best seen in FIGS. 3a and 3b, lower wire 42 is guided from forehead pad 12 down to in front of the ear 52 and then up and round to behind the ear 52 before passing to the knob 46 on nape extension 36. This arrangement spreads allows the clamping forces to the head provided by tensioning wires 40,42 to relatively evenly press the side support pads 6, 8 to the wearers head.

Also visible in FIG. 3b are grooves 53 in the material of support pad 6. These grooves act as hinges allowing hinging of the front 6A, middle 6B and rear 6C portions of the pad relative to each other. This aids in the pad 6 conforming o the head of a wearer.

Figure 4:
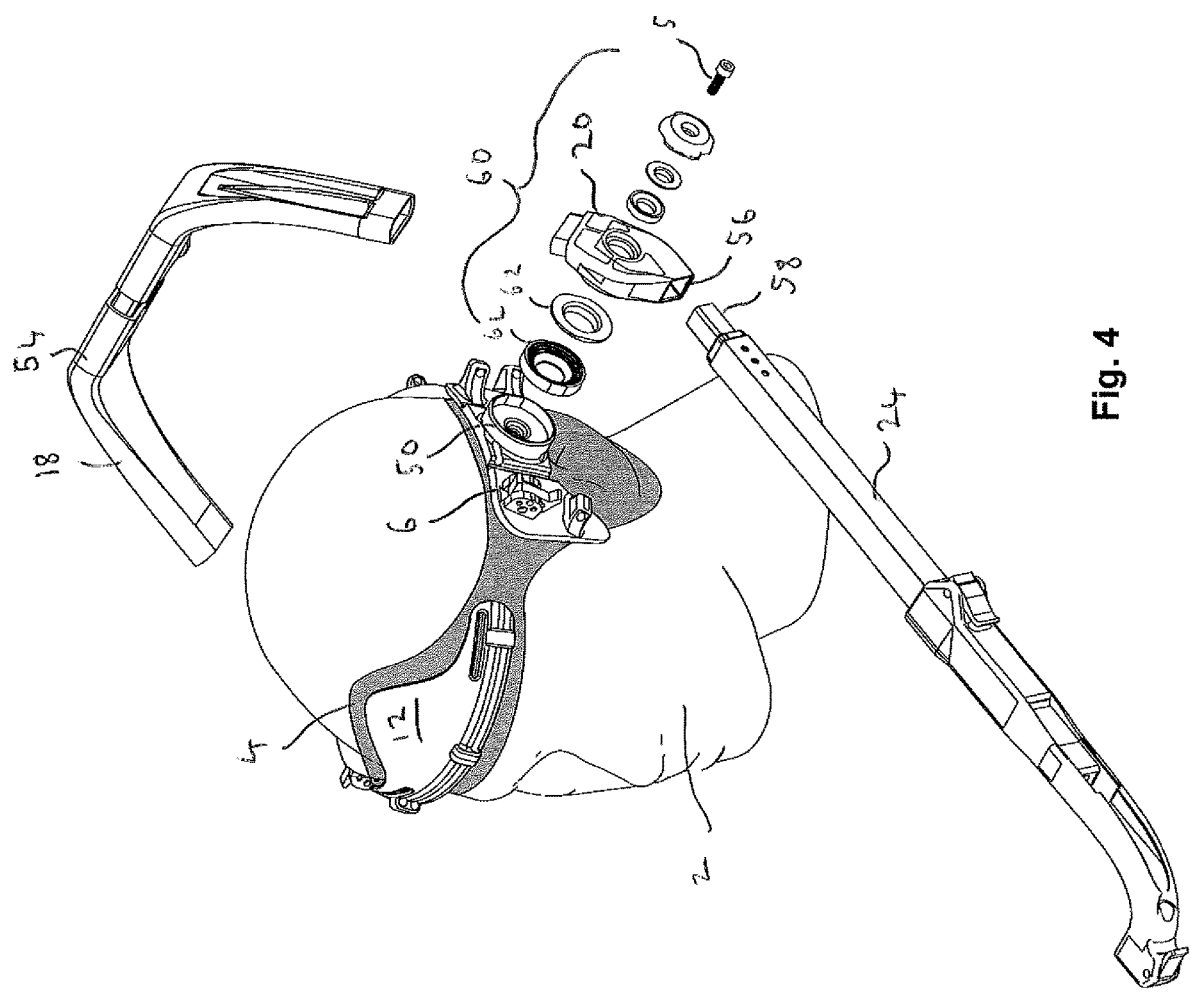
FIG. 4 shows a helmet in schematic perspective, part exploded, view.

FIG. 4 is a perspective view similar to that of FIG. 1 but exploded to show connectivity of certain parts. Brace member 18 has a main arc part 54 that connects to first and second ends 20, 22 (22 not visible in this figure, see FIG. 1). First end 20 includes a slot 56 to accept an end 58 of boom 24. The brace member 18 and boom 24 assembly is fitted to boss of side support pad 6 with suitable bolt 58 and washer/bush assembly 60 that includes a pair of complementarily dished parts 62, 64 to provide some rotational freedom allowing angular adjustment (as with a ball and socket type of joint), before securing the assembly in a selected position.

FIGS. 5a and 5b show the arc part 54 of the brace member 18 of previous figures in front elevation. The arc part 54 is adjustable by being provided in two parts 54a and 54b. The parts 54a and 54b are in a sliding telescopic arrangement at the mid-point of the component 55. In FIG. 5a the parts 54a and 54b are further apart than in FIG. 5b. As an alternative adjustment the parts 54a and 54b may be hinged at the mid-point 55, as depicted in FIGS. 5c and 5d which indicate movement about hinge 56. In the examples of FIG. 5 the parts 54a and 54b may be fixed in place ('locked') when in the desired position. For example, by tightening of a locking screw or other releasable fixing.

Figure 6C:
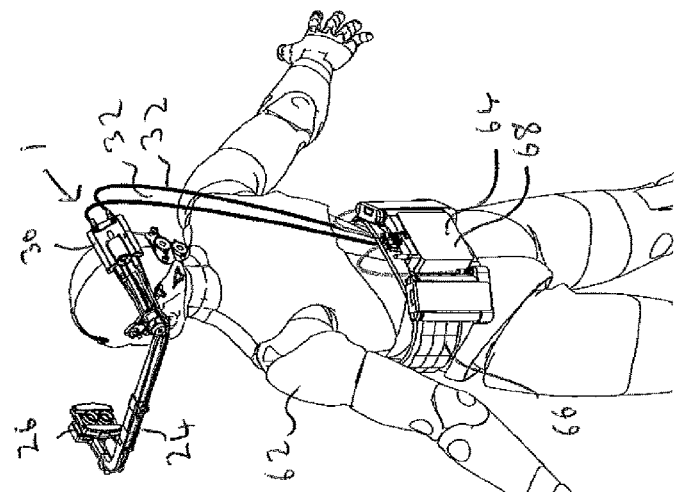
FIGS. 6a, 6b and 6c show wearing of a helmet in schematic rear, side and perspective from the rear, views.
Figure 6B:
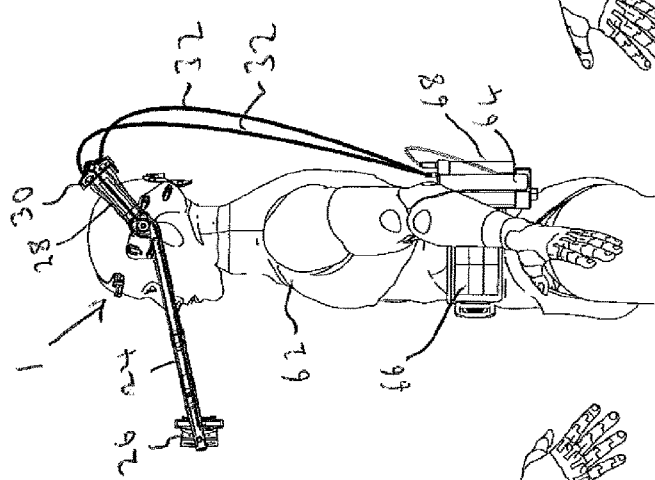
Figure 6A:
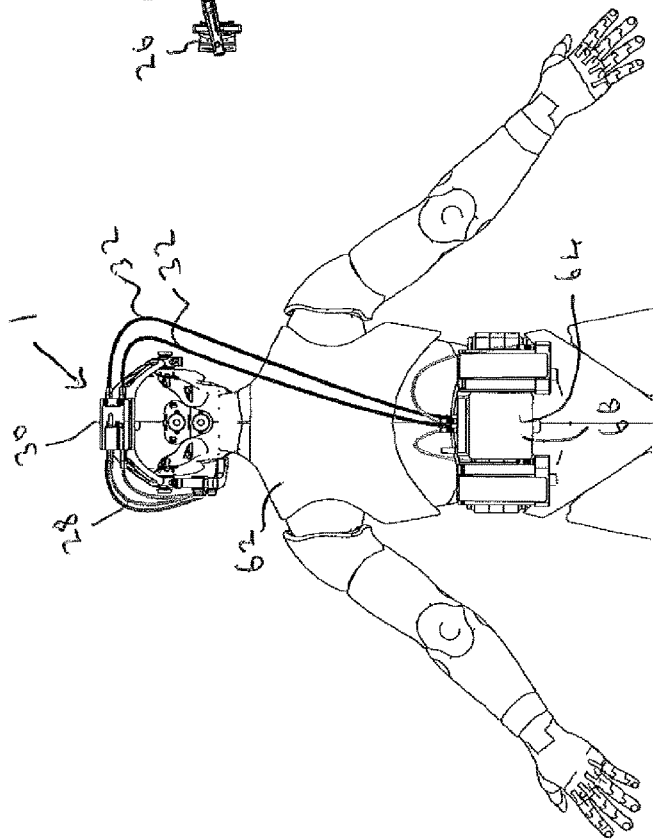
Figure 7:
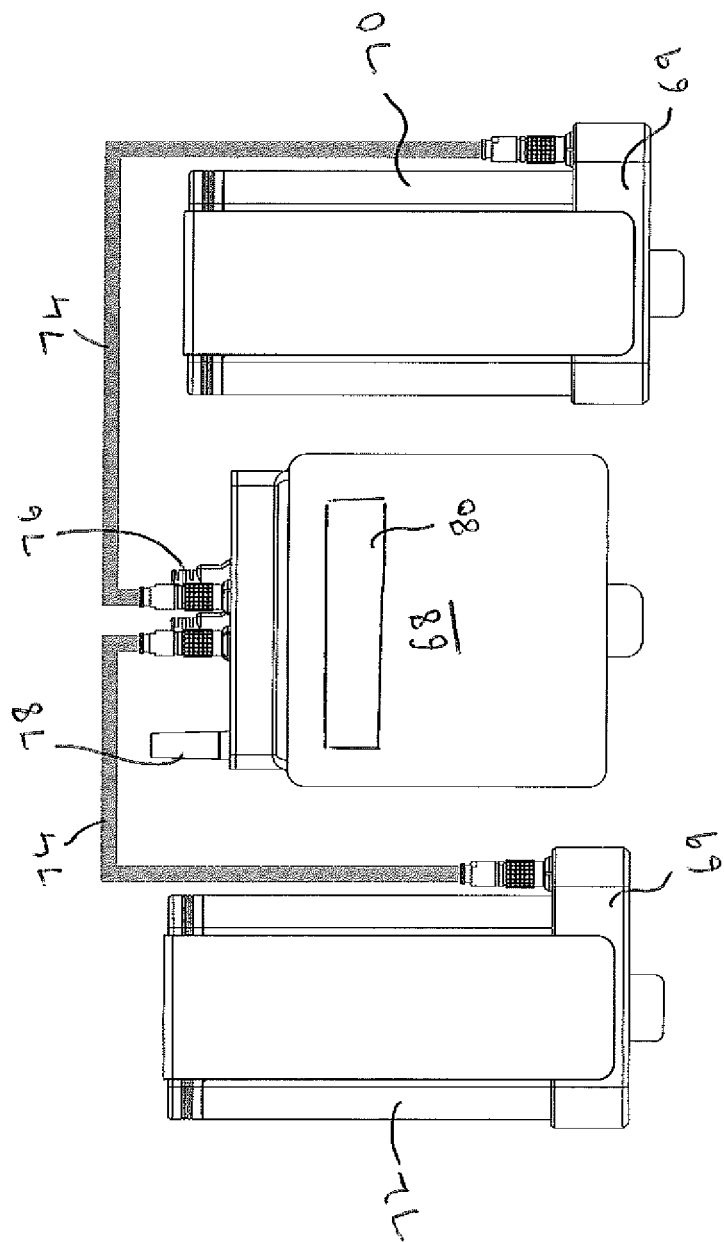
FIG. 7 shows a connector module and battery arrangement.

FIGS. 6a, 6b and 6c show in schematic rear, side and rear perspective views a helmet 1 in use in on a wearer 62. In these views details of the helmet itself are omitted for clarity. These views show the connection of a helmet 1 to a back pack 64 that is worn on a belt 66 abut the wearers waist.

The back pack 66 includes a connector module 68 that can supply power and (optionally) carries control signaling via cables 32 to and/or from connection box 30. In this example the connector module 68 is also a video signal recorder and wireless transmitter of data.

As can be seen in FIG. 7 the connector module 68 connects to battery holders 69 that can carry battery packs 70 and 72—via cabling 74.

Module 68 also includes connectors 76 for cabling 32 (seen in FIG. 6) and has an antenna 78 for transmitting/receiving wireless signaling. An internal wireless antenna may be used as an alternative. Connector module 68 allows battery packs 70,72 to be replaced without interrupting use of the helmet to record video images. One battery continues to power the equipment whilst the other is inserted into its position or is replaced with a fresh battery. The module 68 also allows monitoring of battery condition, sending data to a base station to prompt replacement as required.

Module 68 can transmit video images. Typically, the video images captured by the camera(s) of the helmet are transmitted live to a base station for live viewing and optionally, recording for immediate director/editorial consideration. The images are also recorded in best available quality in the recorder equipment of module 68 for downloading and manipulating later. A display screen 80 is provided for displaying data such as the IP address of module 68.

The invention claimed is:

1. A helmet for carrying audio-visual equipment, the helmet comprising:
 a) a brace member having first and second ends, the brace member passing in a spaced apart relationship from the left side of the head to the right side of the head of a wearer in use, until connecting at each end to a respective left or right side of the helmet;
 b) a boom having a first boom end and a second boom end, the boom connecting at the first boom end to one of the first and second ends of the brace member and having a mounting for carrying at least one camera in a position near the head of a wearer;
 c) a clamping mechanism formed and arranged to clamp the helmet to the head of the wearer, wherein the clamping mechanism comprises one or more tensioning wires or straps; and
 d) one or more support pads, wherein at least one tensioning wire or strap acts on the one or more support pads, urging the one or more support pads to a closer fit about the head of the wearer, wherein the at least one tensioning wire or strap is spaced outwardly from the one or more support pads by one or more support pad projections.

2. The helmet of claim 1, wherein the first and second ends of the brace member connect to the one or more support pads.

3. The helmet of claim 1, wherein the first and second ends of the brace member connect to a respective left side support pad of the one or more support pads and right side support pad of the one or more support pads.

4. The helmet of claim 2 further comprising a forehead support pad.

5. The helmet of claim 2 wherein the one or more support pads comprise a back of the head support pad.

6. The helmet of claim 1 wherein the one or more support pads include a plurality of support pads each including a support pad body, the at least one tensioning wire or strap sitting in a groove or passing through a bore formed in a support pad projection, to carry and direct the wire or strap about the outside of the bulk of a respective support pad body, without otherwise contacting the respective support pad body.

7. The helmet of claim 1 comprising a left side support pad and a right side support pad; and
 wherein there are two support pad projections, one towards the front and one towards the back of each side support pad, for each tensioning wire or strap acting on it.

8. The helmet of claim 7 wherein two tensioning wires or straps are provided, one locating towards the top and the other towards the bottom of each of the side support pads.

9. A helmet for carrying audio-visual equipment, the helmet comprising:
 a) a brace member having first and second ends, the brace member passing in a spaced apart relationship from the left side of the head to the right side of the head of a wearer in use, until connecting at each end to a respective left or right side of the helmet;
 b) a boom having a first boom end and a second boom end, the boom connecting at the first boom end to one of the first and second ends of the brace member and having a mounting for carrying at least one camera in a position near the head of a wearer;
 c) a clamping mechanism formed and arranged to clamp the helmet to the head of the wearer, wherein the clamping mechanism comprises one or more tensioning wires or straps; and
 d) one or more support pads, wherein at least one tensioning wire or strap acts on the one or more support pads, urging the one or more support pads to a closer fit about the head of the wearer, wherein the relationship between a tensioning wire or strap and a respective one of the one or more support pads can be fixed by clamping the wire or strap to the support pad.

10. A helmet for carrying audio-visual equipment, the helmet comprising:
   a) a brace member having first and second ends, the brace member passing in a spaced apart relationship from the left side of the head to the right side of the head of a wearer in use, until connecting at each end to a respective left or right side of the helmet;
   b) a boom having a first boom end and a second boom end, the boom connecting at the first boom end to one of the first and second ends of the brace member and having a mounting for carrying at least one camera in a position near the head of a wearer;
   c) a clamping mechanism formed and arranged to clamp the helmet to the head of the wearer, wherein the clamping mechanism comprises one or more tensioning wires or straps; and
   d) one or more support pads, wherein at least one tensioning wire or strap acts on the one or more support pads, urging the one or more support pads to a closer fit about the head of the wearer, further comprising a flexible headband of sheet material for wearing around the head of the wearer, that mounts the brace member and boom.

11. The helmet of claim 10 wherein the flexible headband is open, passing around the head but not covering the top.

12. The helmet of claim 10, wherein all the support pads are mounted to the outwards facing surface of the flexible headband.

13. The helmet of claim 1 wherein the brace member is adjustable in spacing between first and second ends.

14. The helmet of claim 1 wherein the brace member comprises a connection box including at least one of:
   connections for cabling;
   a wireless transmitter; and
   a wireless receiver.

15. The helmet of claim 1 wherein the boom connects directly to the first or second end of the brace member.

16. The helmet of claim 1, further comprising at least one camera and a strobe light to illuminate a face of the wearer, wherein the strobe light is synchronised with the camera frame timing.

17. The helmet of claim 1 further comprising a connector for at least two batteries to supply power for at least one camera;
   wherein the connector includes circuitry to allow fitting of a battery or replacement of a fitted battery, without interruption of the power supply.

* * * * *